United States Patent
Marincic et al.

(10) Patent No.: US 6,187,469 B1
(45) Date of Patent: Feb. 13, 2001

(54) HIGH TEMPERATURE SOLID STATE HOLLOW CYLINDRICAL BATTERY INCLUDING A PLURALITY OF SOLID POLYMER ELECTROLYTE CELL

(75) Inventors: Nikola Marincic, Winchester, MA (US); Claude Létourneau, Montreal-ouest (CA); John W. Harrell, Waxahachie, TX (US)

(73) Assignees: Hydro-Québec, Montréal (CA); Redox Engineering Inc., Winchester, MA (US); Baker Hughes Inteq, Houston, TX (US)

( * ) Notice: Under 35 U.S.C. 154(b), the term of this patent shall be extended for 0 days.

(21) Appl. No.: 09/221,122

(22) Filed: Dec. 28, 1998

(51) Int. Cl.[7] .............................. H01M 2/12; H01M 6/44; H01M 10/50
(52) U.S. Cl. .............................. 429/56; 429/94; 429/120; 429/160; 429/164
(58) Field of Search .............................. 429/87, 149, 123, 429/152, 153, 157, 158, 159, 160, 164, 94, 56, 120

(56) References Cited

U.S. PATENT DOCUMENTS

| | | |
|---|---|---|
| 2,663,749 | * 12/1953 | Warner et al. . |
| 3,023,260 | 2/1962 | Coler et al. . |
| 3,761,314 | * 9/1973 | Cailley . |
| 3,876,471 | * 4/1975 | Jones . |
| 4,262,064 | 4/1981 | Nagle . |
| 4,539,272 | * 9/1985 | Goebel . |
| 4,675,259 | * 6/1987 | Totty . |
| 4,937,154 | 6/1990 | Moses et al. . |
| 5,370,711 | * 12/1994 | Audit et al. . |
| 5,571,632 | * 11/1996 | Teramoto . |
| 5,709,964 | * 1/1998 | Christensen et al. . |

* cited by examiner

Primary Examiner—Carol Chaney
Assistant Examiner—Susy Tsang
(74) Attorney, Agent, or Firm—Oblon, Spivak, McClelland, Maier & Neustadt, P.C.

(57) ABSTRACT

There is disclosed a battery system to be used in downhole application. The battery system provides energy to operate the measurement devices associated with drilling. The system includes a plurality of cells, each comprising an electrically insulating mandrel which is shaped to fit over an inner tube, and a combination of an anode, a cathode and a solid polymer electrolyte, all disposed over the mandrel. The individual cells are mounted end to end and are interlocked together to prevent rotation of the cells relative to one another. The cells are electrically connected together and they are all mounted between an inner and an outer tube.

19 Claims, 6 Drawing Sheets

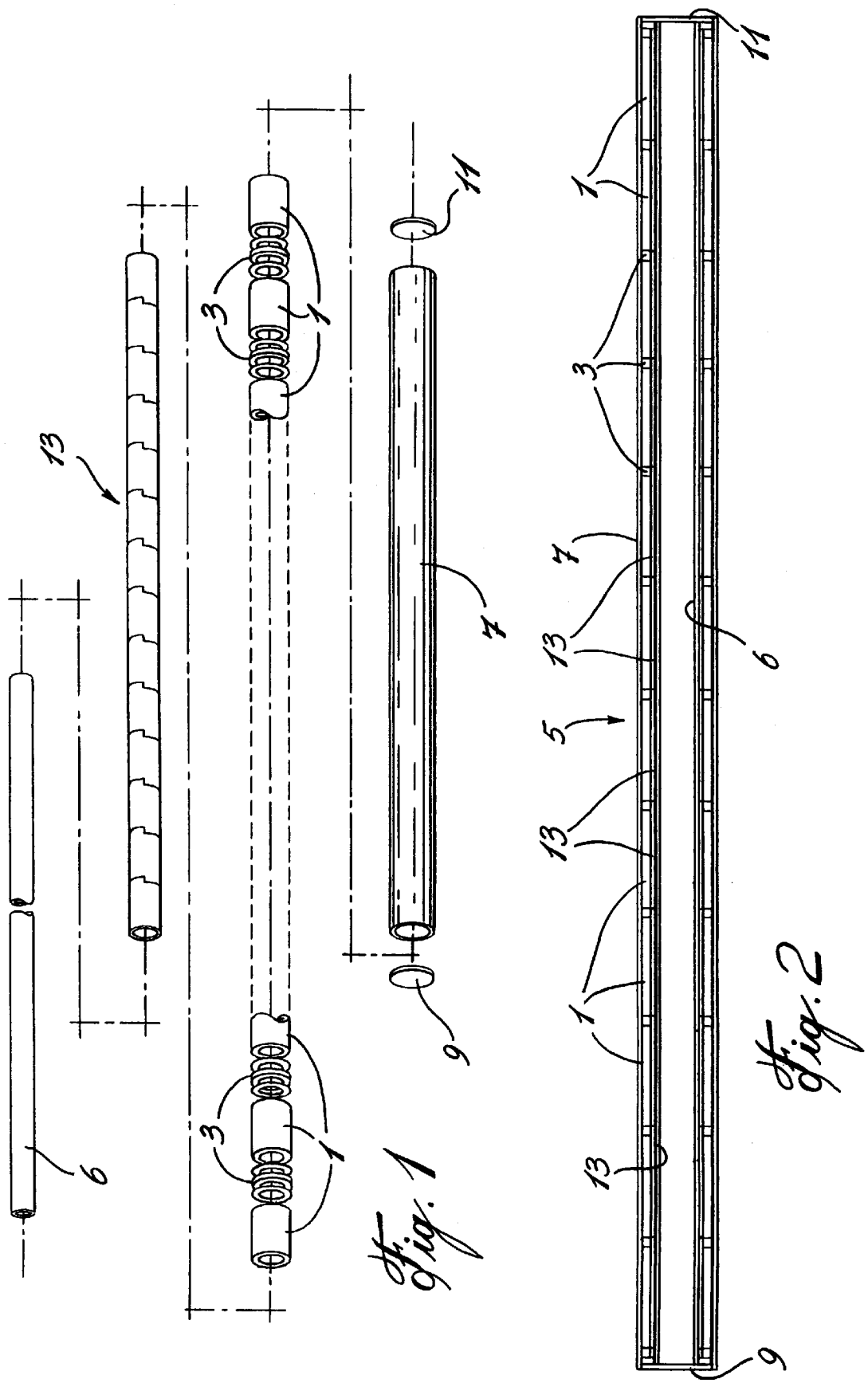

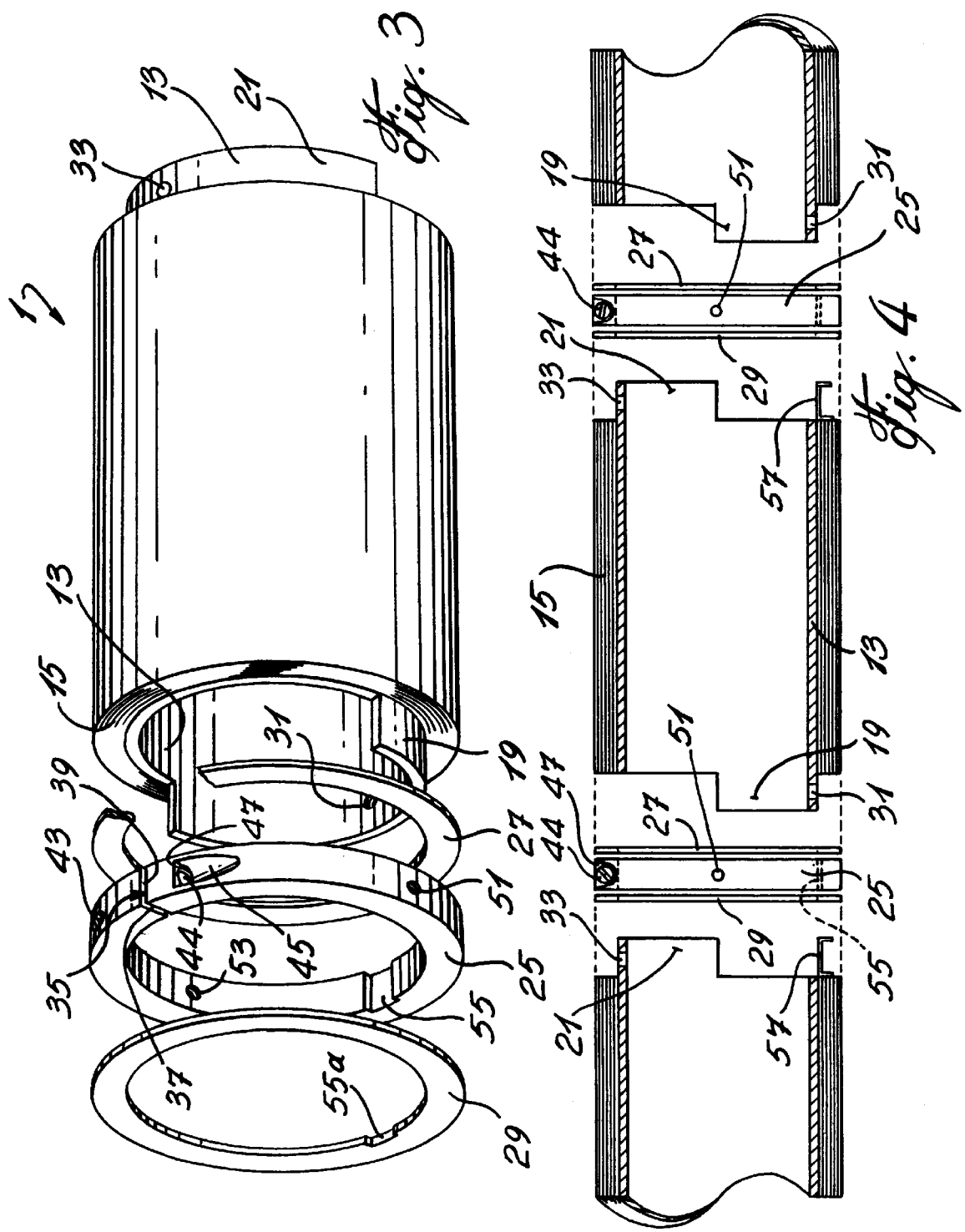

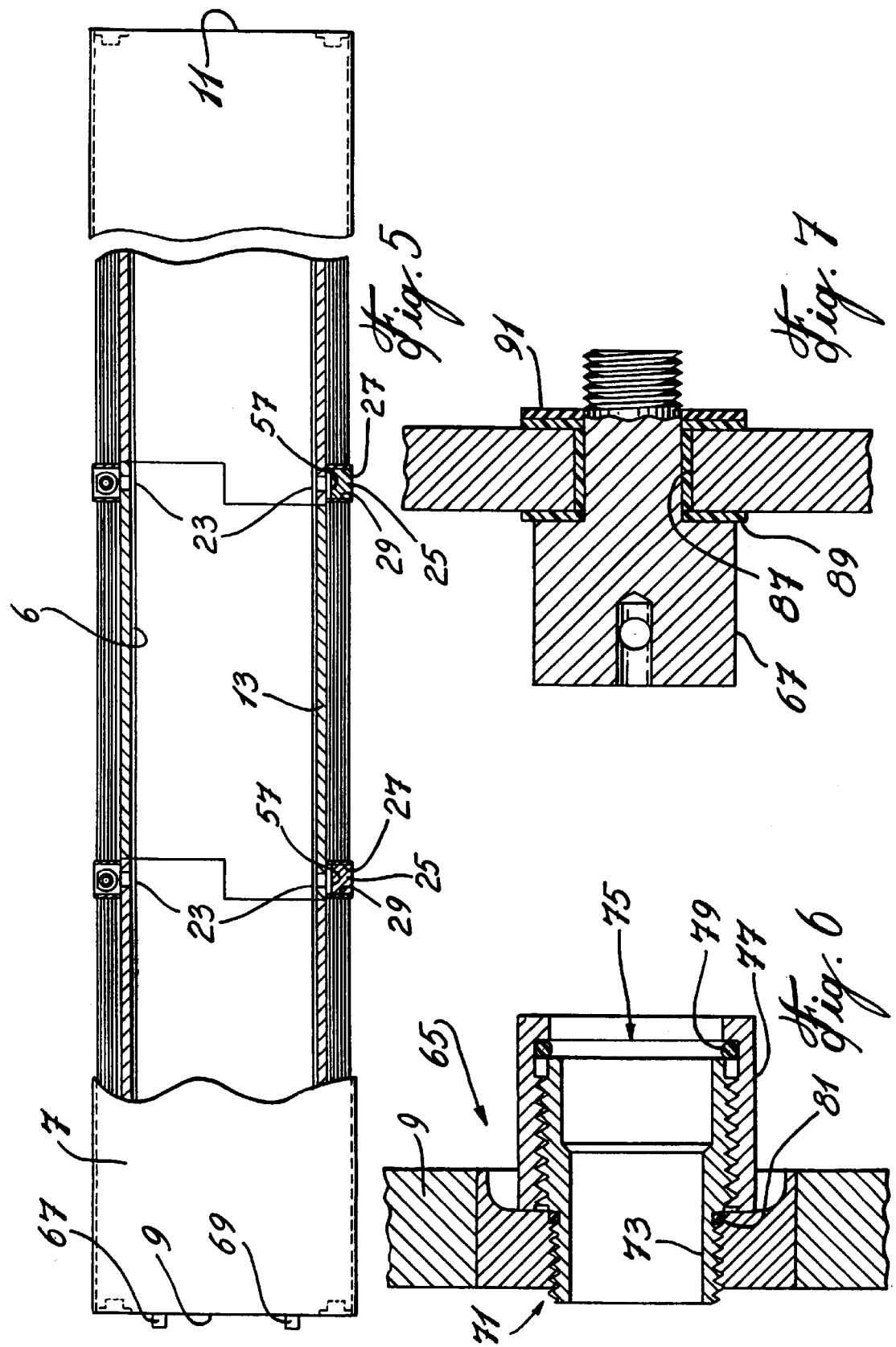

HIGH TEMPERATURE SOLID STATE HOLLOW CYLINDRICAL BATTERY INCLUDING A PLURALITY OF SOLID POLYMER ELECTROLYTE CELL

BACKGROUND OF INVENTION a) Field of the Invention

This invention relates to a high temperature solid state hollow cylindrical rechargeable battery. More particularly, the present invention is concerned with a high temperature rechargeable lithium battery system for downhole application, such as oil and gas well logging and drilling. Still more specifically, the present invention is directed to a battery system for well logging and drilling apparatuses which can be operated even at temperatures up to 125° C. and higher for extended periods of time.

b) Description of Prior Art

In oil well logging and drilling operations, primary lithium batteries such as those based on a liquid thionyl chloride electrolyte have been used to power monitoring systems to collect information such as pressure, temperature, stress, magnetic field, and the like during the drilling operation. Although these batteries have excellent energy density (typically in the range of 900 Wh/L), the task of replacing them is relatively time consuming as compared to the usable life time of the batteries. For example, a typical liquid thionyl chloride battery used in oil drilling has about 70 hours of usable operating capacity, because it is a primary cell, only about 75% of its full capacity is used to avoid facing premature battery end of life condition during a drilling mission. Furthermore, it will be noted that the operation of replacing a battery requires approximately three days.

It will be realized that from the standpoint of operation and cost, an obvious solution to the problem of having to frequently replace the battery would be to use a rechargeable battery. However, to Applicant's knowledge, high temperature rechargeable batteries for liquid or gel electrolyte systems are not presently available to achieve the above goal, unless they are provided with sufficient cooling device. Of course this is not possible nor economical in a drilling environment.

In spite of the other defects of liquid electrolyte batteries, in the context of a well logging and drilling operation, it will be obvious to one skilled in the art that, unless liquid electrolyte cells are assembled each in their own containers, it is not possible to mount them in series in a single container, which is highly desirable in well logging and drilling operations.

A review of the prior art does not seem to provide an answer to the problems outlined above. Of course, rechargeable solid polymer electrolyte batteries have been known for a number of years, and have been developed especially because they are highly rechargeable and do not have the known disadvantages of liquid electrolyte batteries. Since liquid electrolyte batteries have to be discarded after discharge in well logging and drilling operations, and because the batteries contemplated should be hollow cylindrical. U.S. Pat. Nos. 3,023,260, 4,262,064 and 4,937,154 have to be discarded as not being adaptable for the contemplated use. On the other hand, U.S. Pat. No. 5,571,632 discloses a cylindrical non aqueous electrolyte cell which is mostly characterized by the sealing means disposed at the ends of the battery. This battery does not provide an answer to the need of arranging a stack of batteries which are fixed relative to one another and operate together as a single battery container.

It is an object of the present invention to provide a solid polymer battery with a design suitable for oil and gas well logging and drilling application.

It is another object of the invention to provide a solid state battery for downhole application which can be operated even at temperatures of up to about 125° C. for long periods of time.

It is another object of the present invention to provide a hollow cylindrical shaped solid polymer electrolyte battery which is made of a plurality of cells, each being laminated in a hollow cylindrical design.

It is another object of the present invention to provide a solid polymer electrolyte battery which is rechargeable and consequently can be used repeatedly in an oil well drilling environment for extended periods of time without the need to remove it from the ground.

It is another object of the present invention to provide a rechargeable solid polymer electrolyte battery that can be situated within a space provided between an inner tube and an outer tube, and to use the inner space for communication and power input wiring.

is another object of the present invention to provide a battery system wherein individual cells thereof do not require to be placed in individual containers.

It is another object of the present invention to provide a solid state battery system for downhole application that can be assembled in almost any desired shape within a drilling equipment, because of its thin solid film laminate construction.

It is another object of the present invention to provide a battery system which enables heat generated therein to dissipate through the inner and outer tubes between which the cells are mounted, while maintaining an uninterrupted operation.

It is another object of the present invention to provide a battery system wherein individual cells are interlocked to prevent their rotation relative to one another.

It is another object of the present invention to provide a battery system which incorporates removable and replaceable venting devices and especially adapted terminals.

SUMMARY OF INVENTION

These and other objects of the present invention may be achieved in a battery system to be used in downhole application, having measurement means, the battery system being adapted for providing energy to operate said measurement means. The battery system comprises a plurality of solid polymer electrolyte cells,
each cell comprising
   an electrically insulating mandrel shaped to slidably fit over an inner tube,
   a combination of an anode, a cathode and a solid polymer electrolyte disposed over the inner tube,
means for mounting the plurality of solid polymer electrolyte cells end to end,
means for interlocking same together so as to prevent rotation thereof relative to one another,
means for electrically connecting the plurality of cells, and
an outer tube of heat dissipating material to mount the plurality of cells therein to constitute the battery system.

The anode, cathode, polymer electrolyte combination may be disposed over the mandrel in a jelly roll design, in a flat roll design, or in a flat stack design, The inner and outer tubes are preferably made of heat dissipating material such as stainless steel, and the mandrel is preferable made of anodized aluminum, although any other suitable material may be used.

In accordance with a preferred embodiment of the invention, each mandrel is formed with a partial flange at one end thereof, and a complementary flange at the other end thereof, and these flanges are arranged so that when one cell is joined to another similar cell the partial flange of one cell and the complementary flange of the another cell constitute a continuous interlocking flange. The partial and complementary flanges are suitably of the same dimensions.

In accordance with another preferred embodiment, the battery system according to the invention comprises a ring fixedly mounted over the continuous interlocking flange, and means are provided to insulate the ring from two thereby interconnected cells The ring preferably is size adjustable, and means are provided to tighten the ring over the interlocking flange. For example, the ring is made size adjustable by providing a radial discontinuity therein to form mating ends. In addition, the ring may have tangential bores formed at the mating ends and a tensioning screw may be disposed through the bores to tighten the ring against the continuous interlocking flange.

The ring may also comprise radial threaded bores formed therein, radial holes formed in the partial and complementary flanges opposite the radial bores and set screws are then used to extend through the radial threaded bores into the holes to further prevent rotation of the plurality of batteries relative to one another.

An end cap may be mounted at both free ends of the battery system; between the inner and outer tubes. Also foam insulating washers may be mounted on both sides of the ring between the ring and two adjoining cells.

The preferred means for electrically connecting the plurality of cells comprise cell connection insulated tabs electrically disposed between two adjoining cells. For that purpose, slots are formed in the ring, the tabs then extending from one cell to the next one through the slots.

According to another preferred embodiment, at least one safety vent is provided on at least one end cap, to permit purging of the battery system and escape of gases therefrom in case of undesirable pressure increase. This may be achieved by providing at least one vent opening in at least one end cap, and threaded means are provided to enable to screw the vent into the end cap.

According to the invention, the vent may include a rupture disc which is adapted to a maximum predetermined pressure to be maintained in the battery system. In detail, such a vent may comprise a threaded member adapted to be screwed at one end into the above threaded means of the end cap, and there is provided a disc holding member which is formed with a collar and which is screwable at the other end of the threaded member, a first O-ring disposed between the threaded member and the entrance to the vent opening, the rupture disc thereby being held against the collar, and a second O-ring is provided between the rupture disc and said threaded member.

In accordance with yet another embodiment, the battery system according to the invention comprises terminal openings formed in the end caps, and one positive and one negative terminal are disposed in respective terminal openings. Preferably, the terminals are made of copper and an insulating lining material such as polypropylene is disposed in the respective openings to isolate the terminals from the material of the respective end cap. The terminals can also be made of other metals sealed in glass to insulate them from the body of the end cap.

BRIEF DESCRIPTION OF DRAWINGS

The above and further objects and advantages of the present invention will be apparent to one skilled in the art from the following detailed description of a preferred embodiment given by way of illustration but without limitation, in which FIG. 1 is a schematic exploded view of a battery system according to the invention;

FIG. 2 is a schematic illustration is longitudinal cross-section of the battery system illustrated in FIG. 1;

FIG. 3 is a perspective view of a battery unit which is part of a battery system according to the invention, including an interlocking ring and an insulating foam washer;

FIG. 4 is a partial cross-section view of a battery system according to the invention prior to interconnecting the battery units;

FIG. 5 is another partial cross-section view of a battery system according to the invention showing the outer container in part and the end caps;

FIG. 6 is a cross-section view through one end cap and vent mounted thereon;

FIG. 7 is a cross-section view of a terminal mounted in one end cap;

DESCRIPTION OF PREFERRED EMBODIMENT

Figure 8:
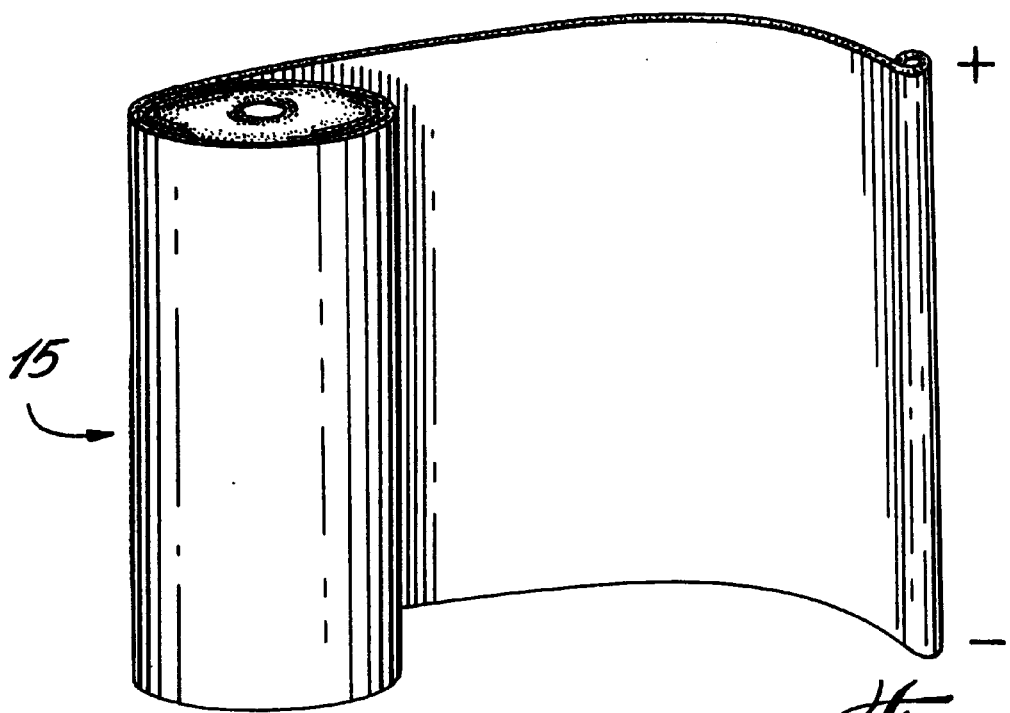
FIG. 8 is a schematic view of a solid lithium polymer battery arranged in a jelly roll design.

Referring to the drawings, it will generally be seen that the battery system illustrated in FIG. 1 is made of a plurality of battery units 1 all interconnected by means of interconnecting rings 3 as shown schematically in the exploded view of FIG. 1. The battery system 5 is illustrated in longitudinal cross-section in FIG. 2.

Referring to the drawings, more particularly FIGS. 2 and 5, it will be seen that the most prominent feature of battery system 5 according to the invention is the fact that a plurality of cells or battery units 1, here twelve in number, although this number can vary to a large extent, are connected in series while being mounted over inner tube 6 in one single battery containers, here outer tube 7. Battery system 5 is closed at both ends by means of hollow end caps 9, 11 (FIG. 2). Each cell 1 being hollow cylindrical or tubular as shown, more particularly in FIG. 3, once connected together as will be discussed in detail hereinafter, they form a continuous mandrel 13, as particularly shown in FIGS. 1, 2 and 5. Both inner and outer tubes 6 and 7 are welded to hollow end caps at both ends of the battery system during assembly.

Figure 9:
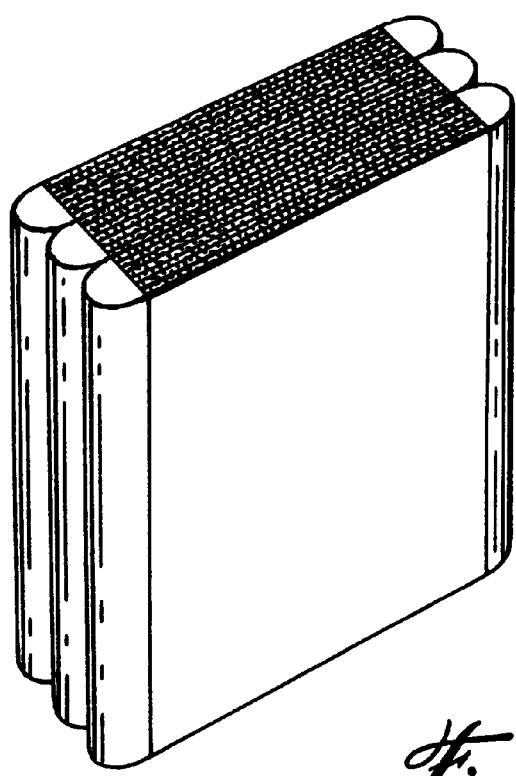
FIG. 9 shows a flat roll design.
Figure 10:
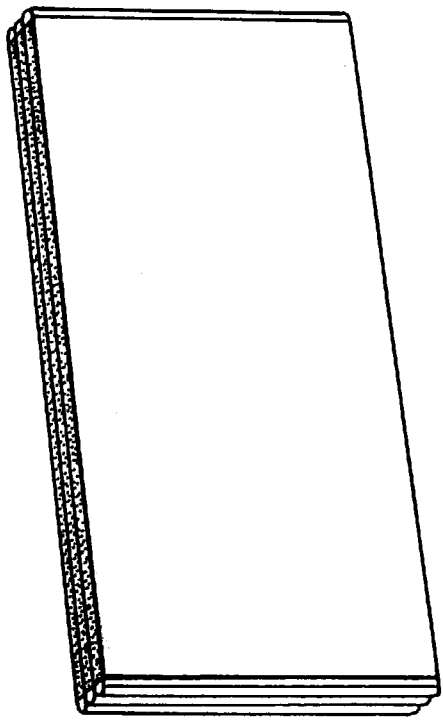
FIG. 10 shows a flat stack design.

For more detail of a cell or battery unit 1 according to the invention, reference will now be made to FIGS. 3 and 4. The cellular part of the battery has been schematically illustrated and consists of a jelly roll design (shown for example in FIG. 8) which consists of a solid polymer electrolyte lithium battery which is well known to those skilled in the art. This electrochemical generator will generally be referred to by reference numeral 15, and consists in known manner of a lithium anode, a $VO_x$ based cathode placed on inert plastic material, a polymer electrolyte and a current collector all in sheet forms and rolled together as schematically illustrated in FIG. 8 Of course, any other arrangement of electrochemical generator, for example the one illustrated in FIGS. 9 and 10 could also be utilized, although it has been found more practical to produce a hollow cylinder shaped battery merely by winding the sheet components of the electrochemical generator around an inner tube 13. Other cell designs (FIGS. 9 and 10) can of course be shaped into a tube, however this procedure would involve more technical problems. The present battery unit is therefore based on a jelly roll design.

Referring again to FIGS. 3 and 4, for a detailed description of battery unit 1, it will be seen that each unit comprises mandrel 13 made of electrically insulating and heat dissipating material, here anodized aluminum, and the electrochemical generator 15 is wound around this mandrel as shown. Mandrel 13 is formed with a partial flange 19 at one end and a complementary flange 21 at the other end. Usually, the two flanges are of similar dimension and in the illustrated embodiment they are both exactly half circular, so that when one cell unit is joined to another similar cell 1, partial flange 19 of the first cell and complementary flange 21 of the other cell will constitute a continuous interlocking flange 23 as particularly shown in FIG. 5.

To constitute a unitary battery system, a plurality of cells 1 are joined together as will now be discussed in detail. This is made possible by providing a plurality of stiffening rings 25 and insulating foam washers 27, 29. In other words, when joined together two similar cells 1 will mate by having partial flange 19 and complementary flange 21 joined to form complementary interlocking flange 23. The latter is maintained fixed by having ring 25 fixedly mounted thereon with insulating foam washers 27, 29 placed on either side of ring 25 to insulate the latter from the two adjoining batteries 1. It should be remembered that once fixed together as indicated above, the two connected cells should be completely fixed relative to one another so that once the twelve units are assembled as indicated, the battery system forms an assembly wherein all the parts are fixed relative to one another. In other words, while the battery system may rotate as a whole, the different cells cannot rotate individually relative to one another.

This is made possible by a special construction of interlocking ring 25 and providing fixing holes 31, 33 respectively in flanges 19 and 21. As illustrated, stiffening ring 25 is rectangular in cross-section, and in order to be size adjustable for enabling it to be tightened over interlocked flanges 19, 23 the stiffening ring is provided with a slit 35 forming a discontinuity which defines two mating ends 37, 39. It will be obvious to one skilled in the art that by urging mating ends 37, 39 towards one another, ring 25 will press against flanges 19, 21. To achieve this, tangential bores 41, 43 are formed respectively at mating ends 37, 39, bore 41 being larger in diameter than bore 43 to accommodate tensioning screw 44 which is adapted to be disposed through bores 41, 43 to tighten the ring against interlocked flanges 19, 21 thereby fixing two adjacent battery units together. To further accommodate the tensioning screw, bore 41 is preceded by a recess 45 of larger diameter than bore 41 and defining a collar 47 against which the head of the tensioning screw comes to rest. Of course a thread 49 is formed in bore 43 into which the tensioning screw is engaged (FIG. 12).

Figure 12:
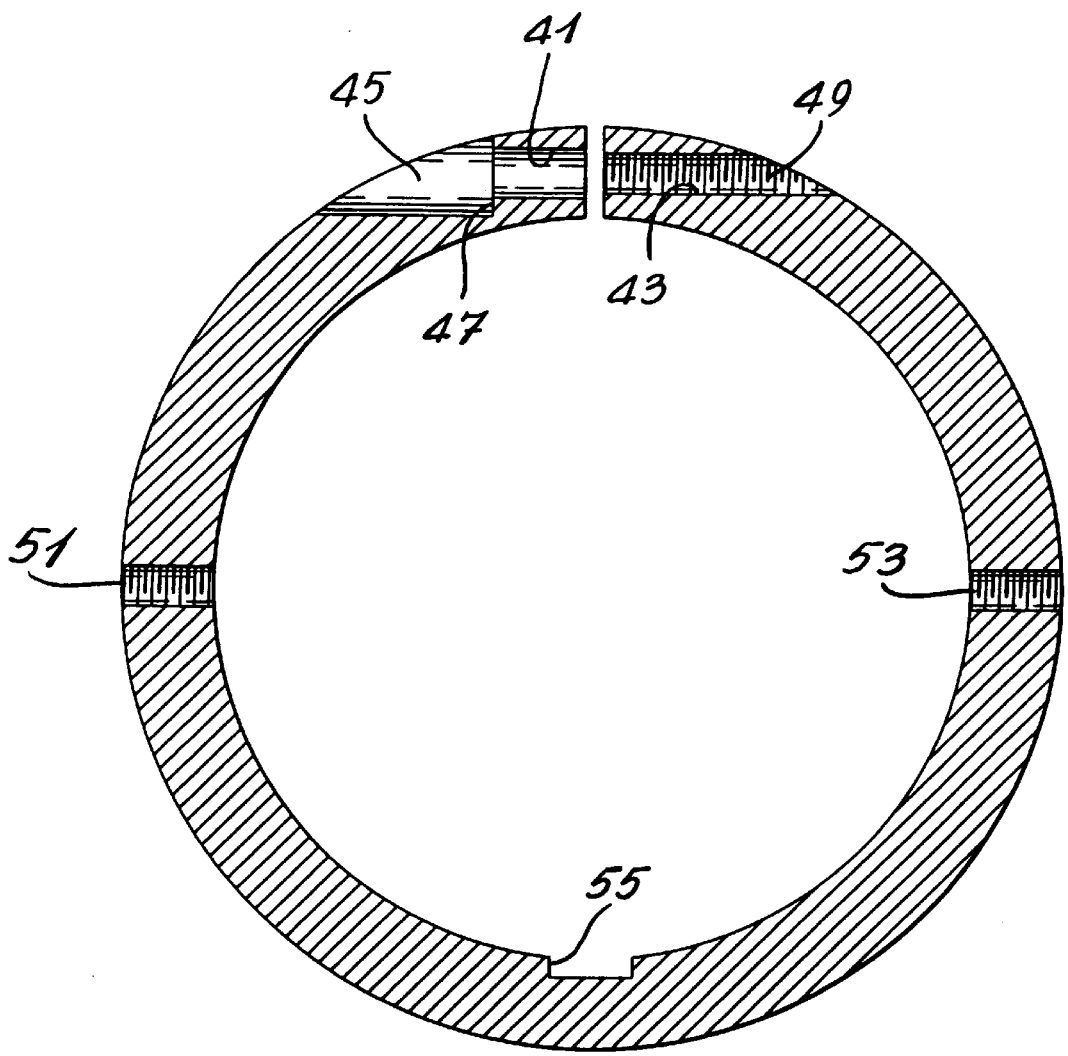
FIG. 12 is a cross-section view of an interconnecting ring.

Referring more particularly to FIGS. 3, 4 and 12, it will be noted that ring 25 additionally comprises threaded radial bores 51, 53 which are designed to be opposite fixing holes 31, 33 when the ring is properly engaged over the interlocked flanges 19, 21. Set screws (not shown) extend through threaded radial bores 51, 53 into fixing holes 31, 33 to further assist in preventing any rotation of adjacent battery units 1, relative to one another or sliding at the ring along the mandrels. Finally, for a reason that will be explained below, there is provided a rectangular depression 55 (FIG. 12) in the inner face of the ring preferably located diametrically opposite slit 35, in the embodiment which has been illustrated, although this positon may vary as one skilled in the art will appreciate. Similar depressions 55a are also formed in foam washers 27, 29, and for the same reason.

Of course, when the cell units have been joined together by means of a plurality of rings 25 (the latter being isolated by means of insulating foam washers 27, 29 respectively disposed between rings 25 and two adjacent cell units) the units must be electrically connected together. This is made possible by providing a cell connection tab 57 of reversed U construction, as shown, although any other type of cell connection may be used as will be appreciated by those skilled in the art. As illustrated, cell connection tab 57 extends under washers 27 and 29 and ring 25, particularly through depression 55, where it comes to rest against the other end of an adjacent cell unit as particularly shown in FIG. 5. The assembly of cell units connected together as previously indicated is placed in an outer tube 7, which is made of heat dissipating material, such as stainless steel. The battery system is closed at both ends by means of hollow end caps 9, 11, each having safety vents 65 mounted therein. Additionally, positive and negative terminals 67, 69 are mounted in one of the two caps, here cap 9. As will be obvious to one skilled in the art, the vents are used to permit purging of the battery system, preferably when assembling it, and also to enable the escape of gases therefrom in case of undesirable pressure increase inside the battery system.

For a detailed description of a vent 65, reference will be made particularly to FIG. 6. To accommodate vent 65, it is first necessary to provide a thread opening 71 in end cap 9, wherein vent 65 is screwed as shown. The body of vent 65 consists of threaded member 73 which is shaped to be screwed at one end into threaded opening 71, a rupture disc 75, a disc holding member 77 and two O-rings 79, 81 which serve to perfectly seal the vent. Since there is a large selection of rupture discs available, they provide a wide choice of venting pressures under which vent 65 should operate.

Finally, as indicated, positive and negative terminals 67, 69 are mounted in end cap 9. For a detailed construction of a terminal according to the invention reference will now be made to FIG. 7 of the drawings. In a suitable location of the end cap a terminal hole 87 is formed. To isolate the metal terminal from the end cap, an insulating polymer member 89 is placed into hole 87 as shown. The terminal itself is fixed into hole 87, by means of fixing washer 91.

Figure 11:
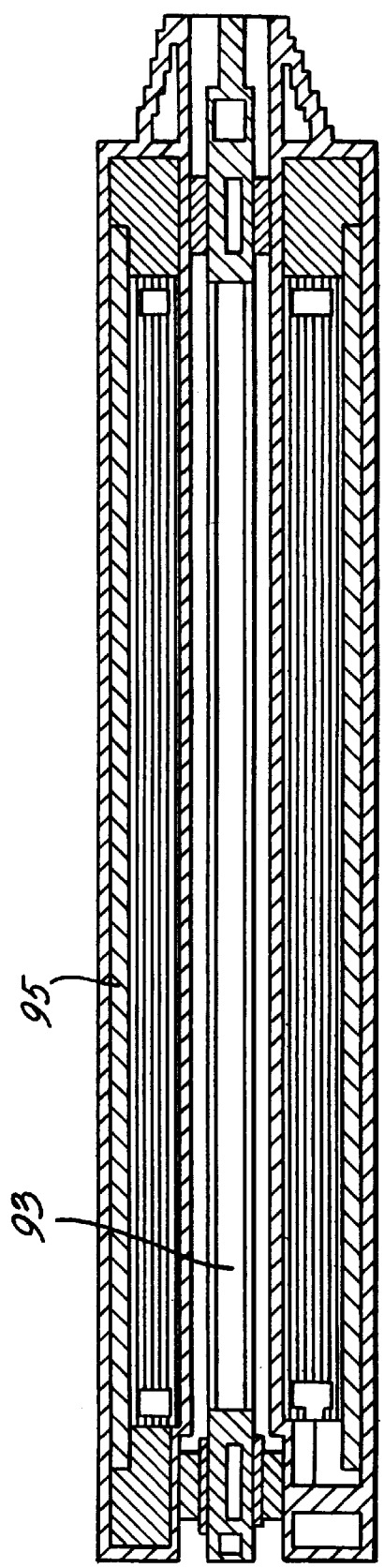
FIG. 11 is a schematic illustration of a drilling rod used for well logging application, provided with a battery system according to the invention.

In operation, the battery according to the invention is mounted in a drilling assembly schematically illustrated in FIG. 11 of the drawings in a space provided between two concentrically located pipes 93, 95. This arrangement becomes particularly significant when one considers the heat management aspect of the battery according to the invention under abusive conditions. In addition, the open space at the center of a battery according to the invention enables to place communication cables with other devices used in downhole assemblies. The open space may also be used to mount other devices within the overall space of the battery.

Another advantage of the battery according to the invention results from the fact that the parts do not move relative to one another. This is particularly important in MWD (measurement while drilling) application in which the entire battery rotates together with the drill bit. The relative rotation of one cell in relation to the neighboring cell has caused many problems with primary batteries in the past since this leads to the breaking of the interconnection tabs. With the battery according to the invention, the interconnecting tabs remain unaffected.

Although this invention has been described with reference to one particular embodiment it is understood that modifications are possible without departing from the spirit and scope of the invention.

We claim:

1. Battery system to be used in downhole application, having measurement means, said battery system being adapted for providing energy to operate said measurement means, and comprising an inner tube, a plurality of solid polymer electrolyte cells, each cell comprising an electrically insulating mandrel shaped to slidably fit over said inner tube, a combination of an anode, a cathode and a solid polymer electrolyte disposed over said mandrel, means for mounting said plurality of solid polymer electrolyte cells end to end, means for interlocking same together so as to prevent rotation thereof relative to one another, means for electrically connecting said plurality of cells, and an outer tube of heat dissipating material to mount said plurality of cells therein to constitute said battery system.

2. Battery system according to claim 1, wherein the anode, cathode, polymer electrolyte combination is disposed over said mandrel tube in a jelly roll design.

3. Battery system according to claim 1, wherein said inner and outer tubes are made of heat dissipating material.

4. Battery system according to claim 1, which comprises an end cap mounted between said inner and outer tubes at both ends of the battery system.

5. Battery system according to claim 1, wherein the inner tube and the outer tube are made of stainless steel.

6. Battery system according to claim 1, wherein each said mandrel is formed with a partial flange at one end thereof, and a complementary flange at the other end thereof, said flanges arranged so that when one cell is joined to another similar cell the partial flange of said one cell and the complementary flange of said another cell constitute a continuous interlocking flange.

7. Battery system according to claim 6, which comprises a stiffening ring fixedly mounted over said continuous interlocking flange, and means insulating said stiffening ring from two thereby interconnected cells.

8. Battery system according to claim 7, wherein said stiffening ring is size adjustable, and means are provided to tighten said stiffening ring over said interlocking flange.

9. Battery system according to claim 7, wherein said stiffening ring is made size adjustable by providing a radial discontinuity therein to form mating ends.

10. Battery system according to claim 9, wherein said ring has tangential bores formed at said mating ends and a tensioning screw is disposed through said bores to tighten said ring against said continuous interlocking flange.

11. Battery system according to claim 10, which comprises threaded radial bores formed in said ring, holes provided in said partial and complementary flanges opposite said threaded radial bores and set screws extending through said radial bores into said holes to further prevent rotation of said plurality of cells relative to one another.

12. Battery system according to claim 4, which comprises terminals opening formed in said end caps, a positive and a negative terminal at one end cap.

13. Battery system according to claim 7, which comprises foam insulating washers mounted on both sides of said ring between said ring and two adjoining cells.

14. Battery system according to claim 7, wherein said means for electrically connecting said plurality of cells comprise cell connection insulated tabs electrically disposed between two adjoining cells.

15. Battery system according to claim 14, which comprises a slot formed in said ring, said tabs extending from one cell to the next one through said slot.

16. Battery according to claim 4, which comprises at least one safety vent provided on at least one said end caps, to permit purging of said battery system and escape of gases therefrom in case of pressure increase inside the battery system.

17. Battery according to claim 16, which comprises at least one vent opening formed in said at least one end caps, and threaded means enabling to screw said vent into said end cap.

18. Battery system according to claim 17, wherein said vent includes a rupture disc.

19. Battery system according to claim 18, which comprises a threaded member adapted to be screwed at one end at said threaded means of said end cap, a disc holding member formed with a collar and screwable at the other end of said threaded member, a first O-ring between said threaded member and entrance to said vent opening, said rupture disc held against said collar, and a second O-ring between said rupture disc and said threaded member.

* * * * *